US011069325B1

(12) United States Patent
Lin et al.

(10) Patent No.: US 11,069,325 B1
(45) Date of Patent: Jul. 20, 2021

(54) CONTENT RESOLUTION ADJUSTMENT FOR PASSIVE DISPLAY DEVICES

(71) Applicant: Citrix Systems, Inc., Fort Lauderdale, FL (US)

(72) Inventors: Haibo Lin, Nanjing (CN); Cungang Lin, Nanjing (CN); Shihao Qian, Nanjing (CN); Hao Wu, Nanjing (CN)

(73) Assignee: Citrix Systems, Inc., Fort Fauderdale, FL (US)

( * ) Notice: Subject to any disclaimer, the term of this patent is extended or adjusted under 35 U.S.C. 154(b) by 0 days.

(21) Appl. No.: 16/815,483

(22) Filed: Mar. 11, 2020

Related U.S. Application Data

(63) Continuation of application No. PCT/CN2020/071895, filed on Jan. 14, 2020.

(51) Int. Cl.
| | |
|---|---|
| *G06F 3/038* | (2013.01) |
| *G09G 5/00* | (2006.01) |
| *G09G 5/22* | (2006.01) |
| *H04N 9/31* | (2006.01) |

(52) U.S. Cl.
CPC ............ *G09G 5/227* (2013.01); *H04N 9/3188* (2013.01); *G09G 2340/0407* (2013.01); *G09G 2340/145* (2013.01); *G09G 2370/06* (2013.01)

(58) Field of Classification Search
None
See application file for complete search history.

(56) References Cited

U.S. PATENT DOCUMENTS

| | | | |
|---|---|---|---|
| 2011/0142426 A1* | 6/2011 | Sasaki ................. | G11B 27/105 386/337 |
| 2012/0147487 A1* | 6/2012 | Waitzman, III ...... | G10K 11/004 359/804 |
| 2013/0002522 A1* | 1/2013 | Wilsher ............... | G06F 3/1423 345/1.2 |
| 2015/0264299 A1* | 9/2015 | Leech .................. | H04N 19/17 348/78 |

* cited by examiner

*Primary Examiner* — Kirk W Hermann
(74) *Attorney, Agent, or Firm* — Banner & Witcoff, Ltd.

(57) ABSTRACT

Methods and systems for content resolution adjustment for passive display devices are described herein. Passive display devices such as a passive magnifying device (e.g., a screen magnifier) or a projector (e.g., a built-in mobile phone projector) are useful in enlarging photos, documents, videos, etc. for view for small-sized small-screen device screens. However, optimal content resolution for the small-screen device screens may not be optimal for the passive display devices. Particularly, when a small-screen device receives content from a remote computing device, the initial content resolution may not be optimal even for the small-screen device screen because of low transmission speed and/or low bandwidth of a connection with an original data source. Content resolution adjustment is provided in this disclosure by determining distance between the passive display device and the small-screen device, calculating magnification ratio for the passive display device, and adjusting the content resolution based on the calculated magnification ratio.

20 Claims, 17 Drawing Sheets

CONTENT RESOLUTION ADJUSTMENT FOR PASSIVE DISPLAY DEVICES

CROSS-REFERENCE TO RELATED APPLICATIONS

The present application claims priority to International Application No. PCT/CN2020/071895, filed Jan. 14, 2020, and entitled "Content Resolution Adjustment for Passive Display Devices," which is hereby incorporated by reference as to its entirety.

FIELD

Aspects described herein generally relate to computer hardware and software configured to adjust content resolution for passive display devices. More specifically, one or more aspects describe herein provide optimal resolution output via passive display devices for content received by a small-screen device from a remote-access system, a virtualized system, a cloud-based system, and/or an enterprise mobility management system.

BACKGROUND

Small-screen devices (e.g., mobile phone, smartphone, personal digital assistant (PDA), notebook, iPod Touch, client device, terminal, etc.) are used more and more widely by enterprises and individuals. When used for business, small-screen devices sometimes are used to view and share company documents. When used in daily activities, small-screen devices sometimes are used in viewing and sharing photos, browsing the internet, watching entertainment videos, etc. In these scenarios, the viewing experience is limited by the small sizes of the small-screen devices' screens. Passive display devices such as a passive magnifying device (e.g., a screen magnifier) or a projector (e.g., a built-in mobile phone projector, a wireless projector, etc.) may be utilized to enlarge the content size for a better viewing experience. However, the content resolution that is optimal for the small-screen device screen viewing may not be optimal for the passive display device viewing.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards content resolution adjustment for passive display devices.

When content is output on a screen of a small-screen device, the content may be in a first resolution. To adjust the content resolution for view on a passive magnifying device (e.g., a screen magnifier), the small-screen device may determine a maximum screen resolution, a maximum Pixels Per Inch (PPI), and a screen size of the screen of the small-screen device. The small-screen device may further determine a focal length, a preferred view screen resolution, and a screen size of a screen of the passive magnifying device. The focal length may be used to calculate a magnification ratio of the passive magnifying device. In addition to the focal length, to calculate the magnification ratio, a distance between the small-screen device screen and the passive magnifying device screen needs to be determined by the small-screen device. Based on the calculated magnification ratio, the small-screen device may adjust the content on the screen of the small-screen device to a second resolution to provide the preferred view screen resolution of the content on the screen of the passive magnifying device.

Similarly, to adjust the content resolution for optimal view on a screen (e.g., a projector screen, a wall, an object, etc.) for a projector (e.g., a built-in mobile phone projector, a wireless projector, etc.), a size of a projected content needs to be calculated. The projector may project the content onto the screen. The small-screen device may determine specifications (e.g., an aperture width, a focal length, etc.) of the projector. The small-screen device may determine a distance between the projector and the screen. The size of the projected content may be calculated based on the determined distance and the specifications of the projector. A preferred view screen resolution may be determined based on the calculated size of the projected content. The small-screen device may then adjust the content on the screen of the small-screen device to a second resolution matching the preferred view screen resolution of the content on the screen.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

As a general introduction to the subject matter described in more detail below, aspects described herein are directed towards content resolution adjustment for passive display devices. The same content resolution that is optimal for a small-screen device viewing may not be optimal for the passive display device viewing. Particularly, if the content is received from a remote-access system, a virtualized system, a cloud-based system, an enterprise mobility management system, etc., the content received may be in a dissatisfying resolution even for the small-screen device because of low transmission speed, low bandwidth, etc., of a connection with an original data source. In this specification, the first part is dedicated to computing architecture depicting illustrative general computer system, remote-access system, virtualized system, cloud-based system, and enterprise mobility management architecture depicting illustrative enterprise mobility management systems, that may send content to the small-screen device for view. The second part is dedicated to methods and systems for adjusting content resolution by the small-screen device for view via the passive display devices such as a passive magnifying device (e.g., a screen magnifier) or a projector (e.g., a built-in mobile phone projector, a wireless projector, etc.).

Computing Architecture

Figure 1:
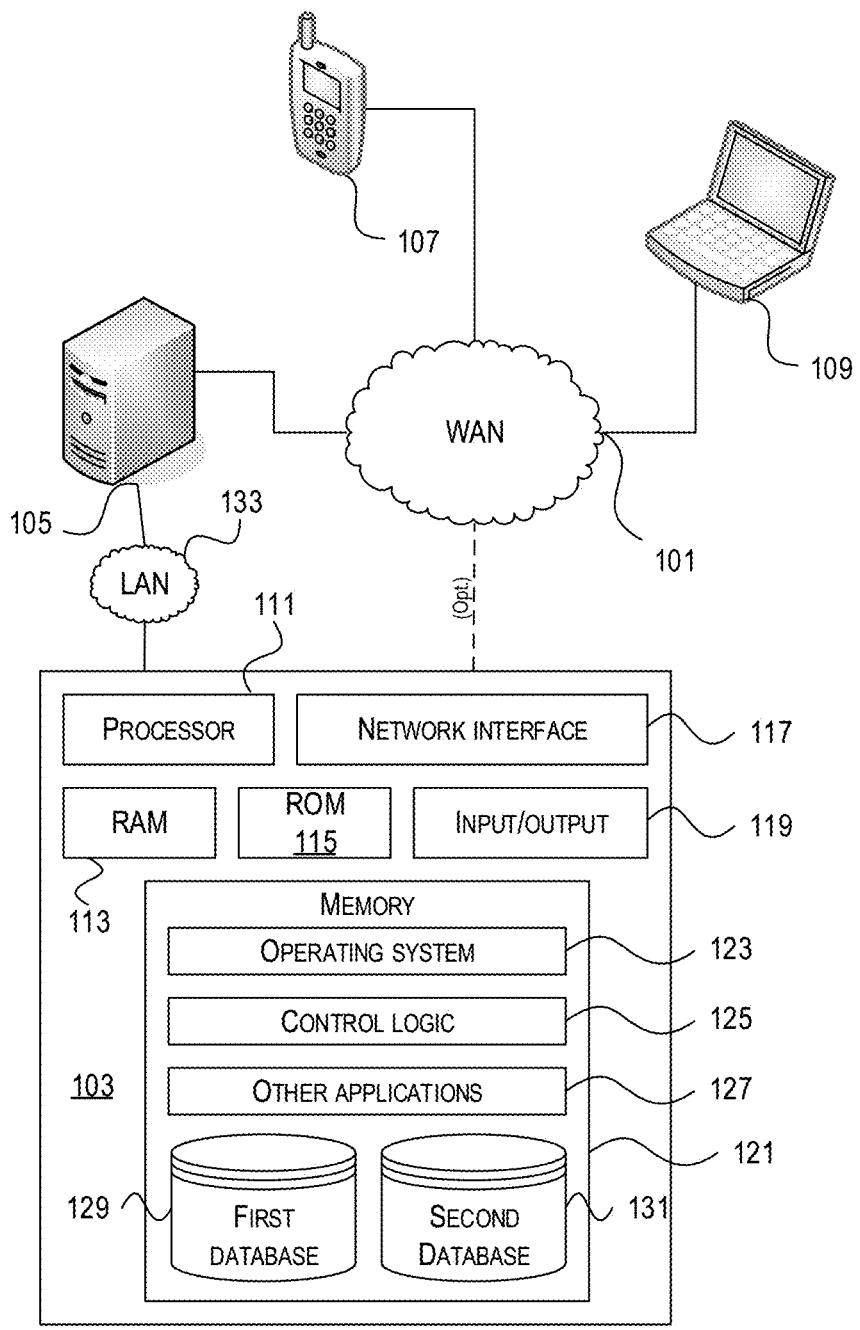
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
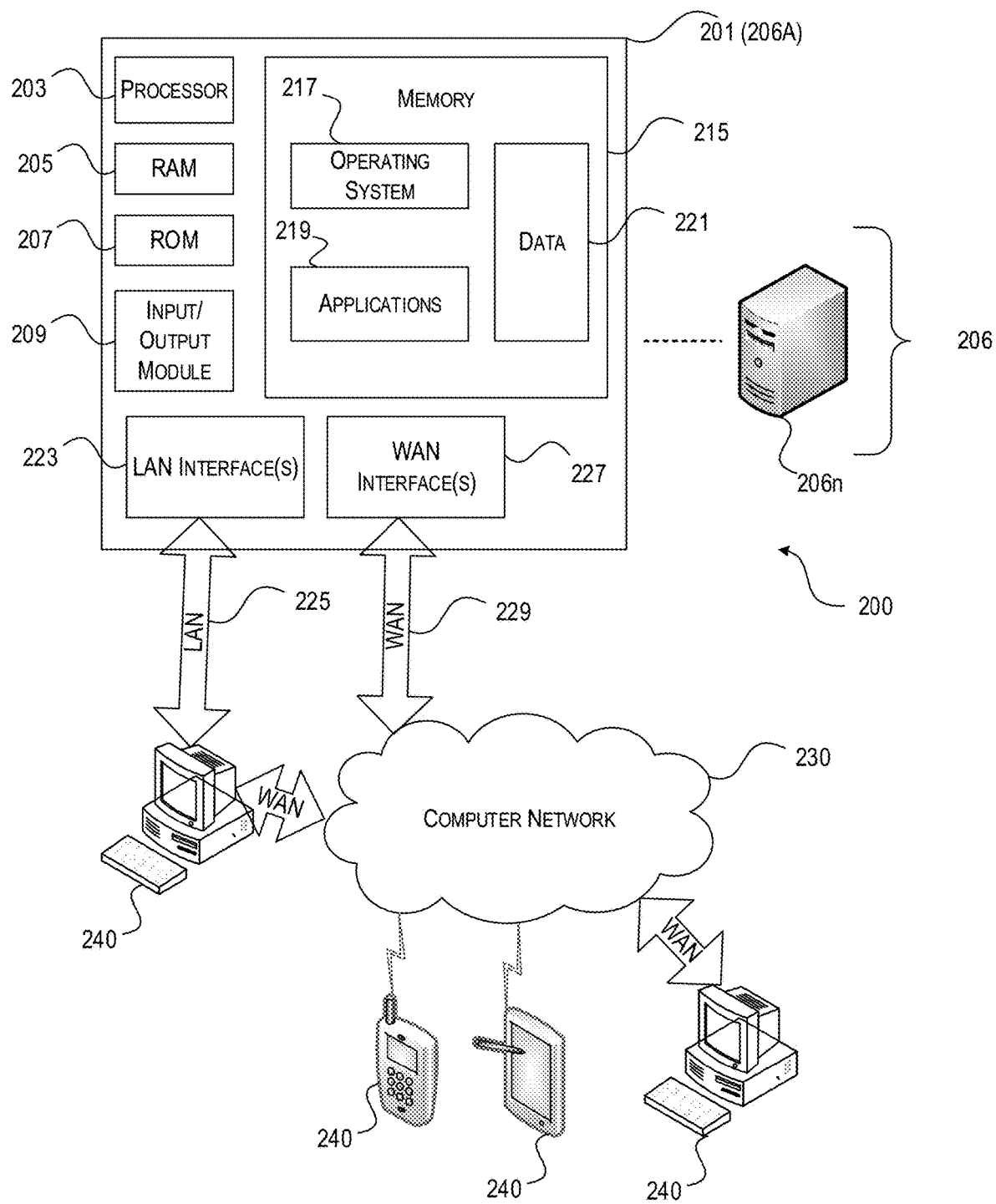
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
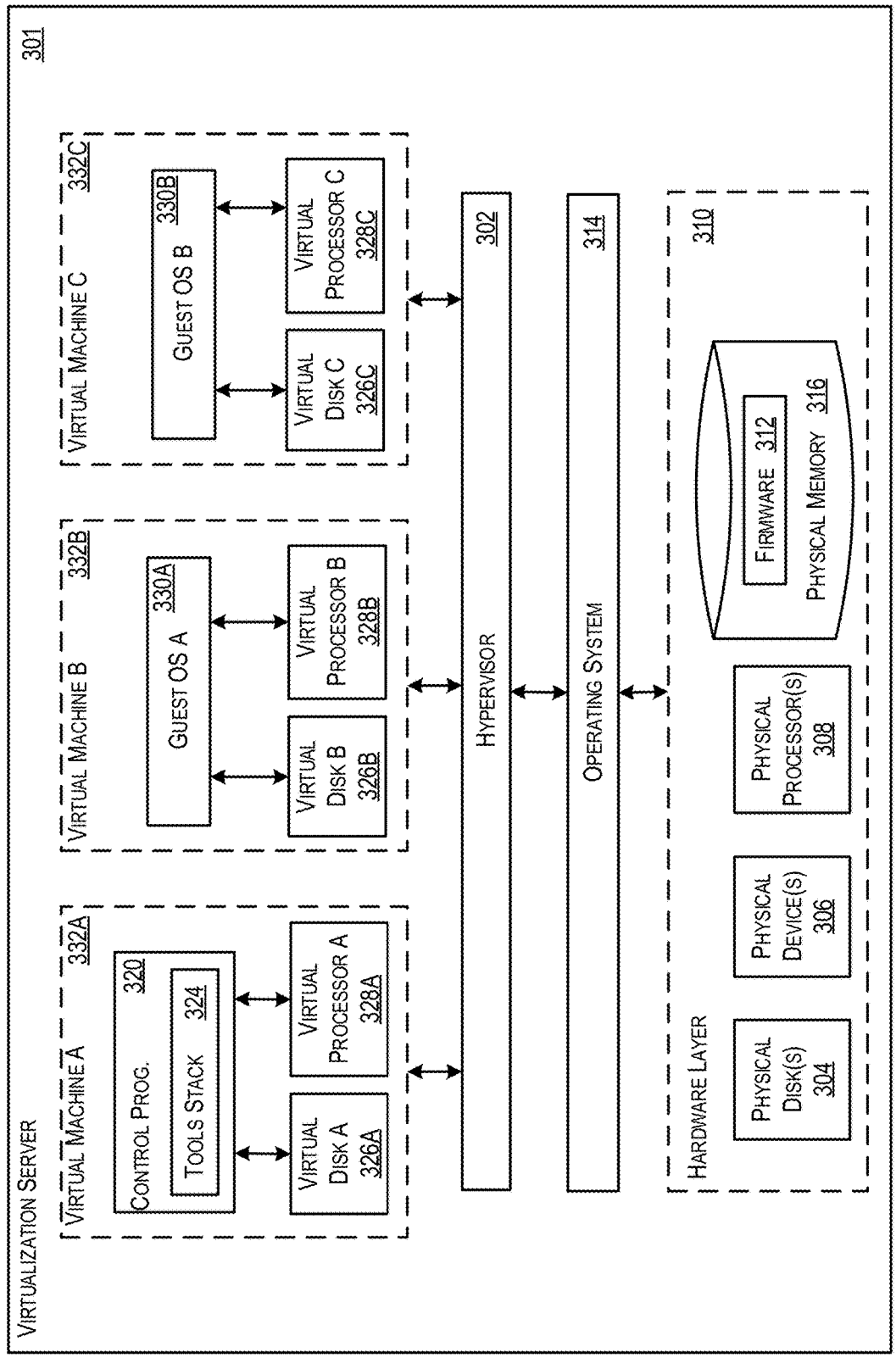
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
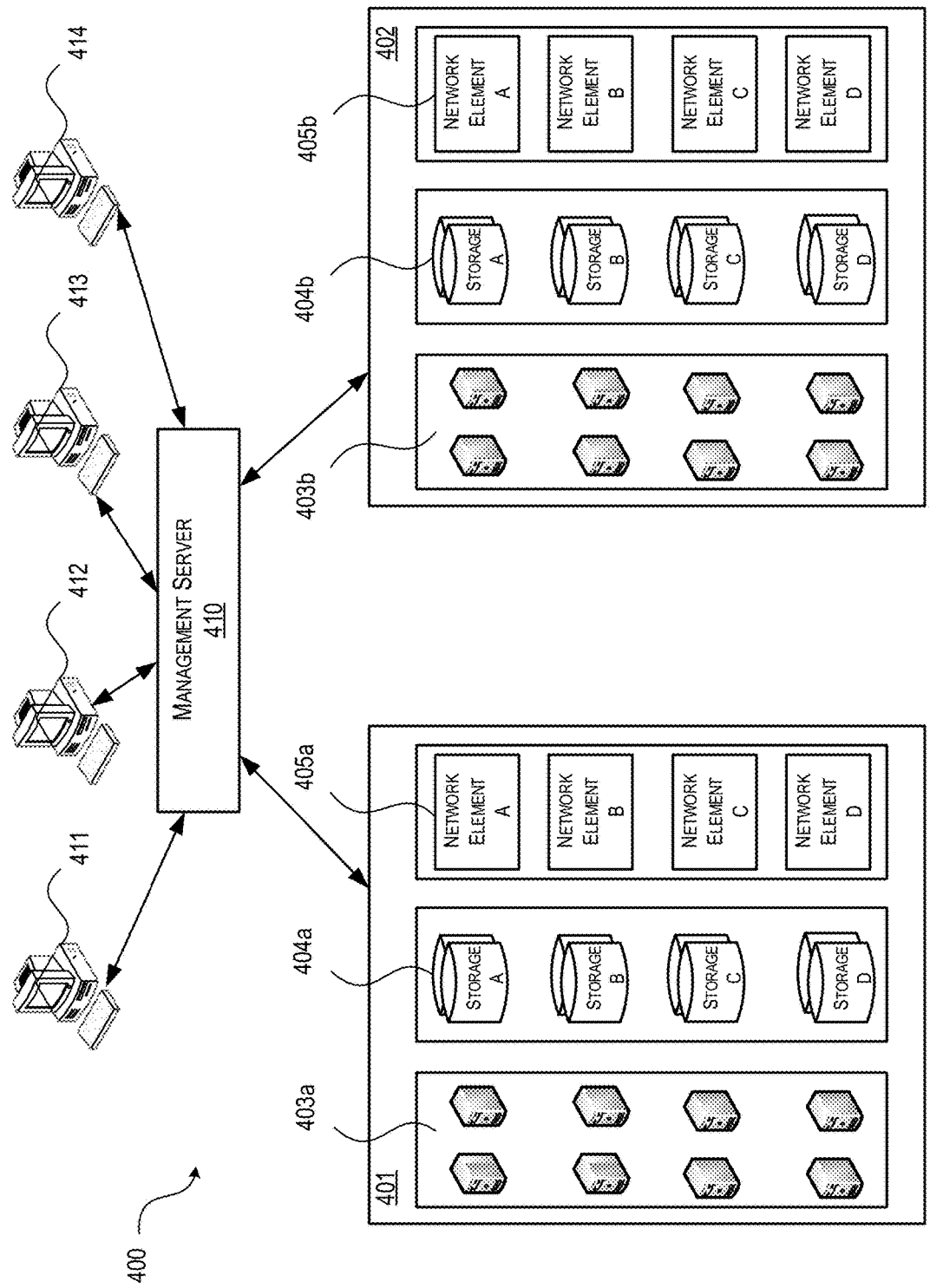
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
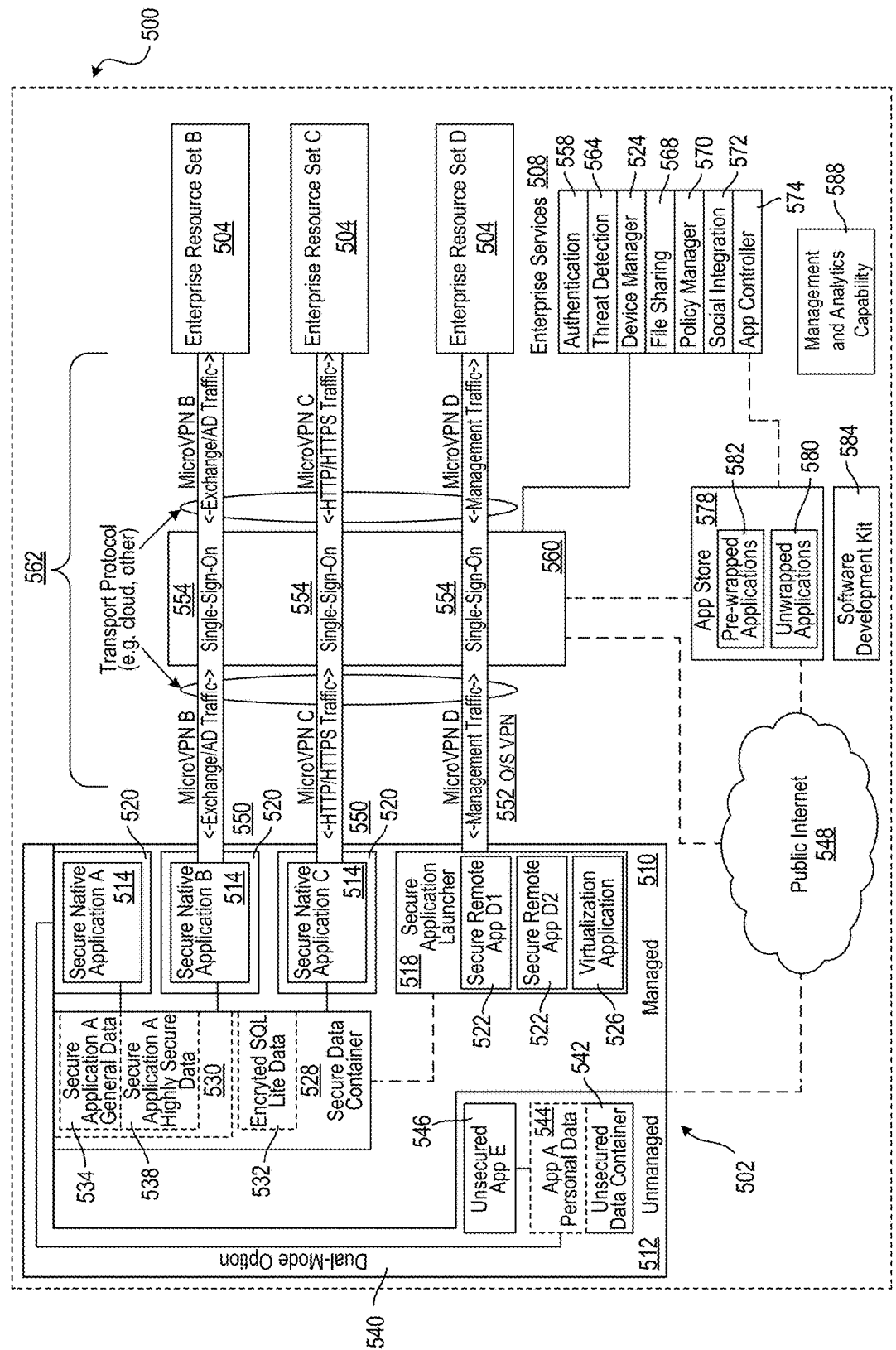
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
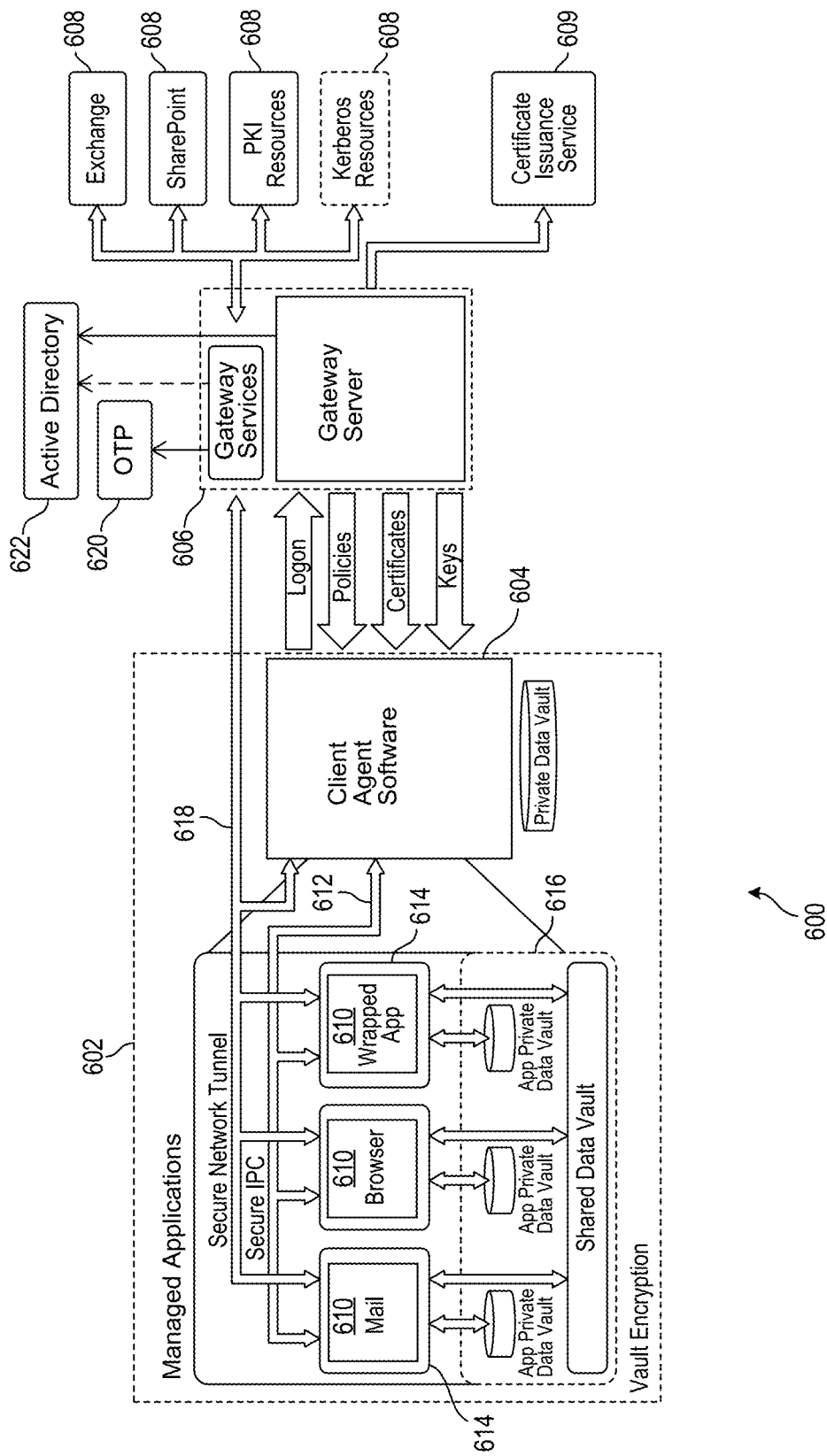
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (for example, Citrix Gateway). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Content Resolution Adjustment

Figure 7:
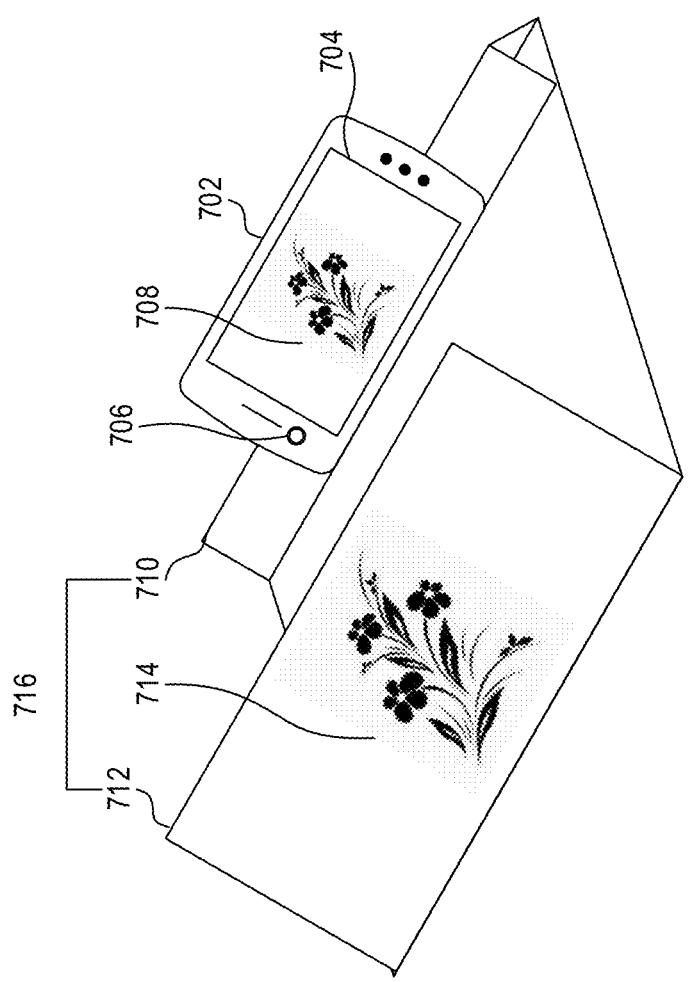
FIG. 7 depicts an illustrative system architecture comprising a passive magnifying device.

FIG. 7 depicts an illustrative system architecture 700 comprising a small-screen device 702 (e.g., mobile phone, smartphone, personal digital assistant (PDA), notebook, iPod Touch, client device 107, terminal 240, etc.) and a passive magnifying device 716 (e.g., a screen magnifier). A screen 704 of the small-screen device 702 may have a size comprising a height, a width, and a diagonal. The screen 704 of the small-screen device 702 may have a maximum screen resolution and a maximum Pixels Per Inch (PPI), both depending on the manufacture. The size, the maximum screen resolution, and the maximum PPI of the small-screen device screen 704 may be retrieved from a small-screen device 702 system information file. The size, the maximum screen resolution, and the maximum PPI of the small-screen device screen 704 may be additionally, or alternatively, revised or input by a user on the small-screen device 702.

A front-facing camera 706 of the small-screen device 702 may capture images of a screen 712 of the passive magnifying device 716. The small-screen device 702 may detect sizes of the passive magnifying device screen 712 in the captured images. The small-screen device 702 may then calculate a distance between the small-screen device screen 704 and the passive magnifying device screen 712 based on the detected sizes of the passive magnifying device screen 712 in the captured images. The small-screen device 702 may further comprise proximity, ultrasonic, and/or laser sensors that may be used to measure the distance between the small-screen device screen 704 and the passive magnifying device screen 712. The distance between the small-screen device screen 704 and the passive magnifying device screen 712 may be additionally, or alternatively, input by a user on the small-screen device 702.

The passive magnifying device 716 comprises a stand 710 and the passive magnifying device screen 712. The stand 710 may provide support for placing the small-screen device 702. The stand 710 may be adjustable to be inclined in different angles. The stand 710 may be adjustable to be at different distances from the passive magnifying device screen 712. Different angles of incline and different distances from the passive magnifying device screen 712 may bring different viewing experiences on the passive magnifying device screen 712.

The passive magnifying device screen 712 may be an optical magnifying lens (e.g., a Fresnel lens). The passive magnifying device screen 712 (e.g., the Fresnel lens) may have a focal length. The passive magnifying device screen 712 may have a size comprising a height, a width, and a diagonal. The passive magnifying device screen 712 may have a preferred view screen resolution. Because the passive magnifying device screen 712 only magnifies the small-screen device screen 704 passively, the passive magnifying device screen 712 may not have a screen resolution depending on the manufacture. The preferred view screen resolution of the passive magnifying device screen 712 may be a recommended screen resolution that may bring the optimal viewing experience on the passive magnifying device screen 712. The focal length, the size, and the preferred view screen resolution of the passive magnifying device screen 712 may be input by a user on the small-screen device 702.

Content may be output on the small-screen device screen 704 and may be magnified on the passive magnifying device screen 712. Content may be desktops, applications, Word documents, PowerPoint presentations, Excel sheets, emails, messages, webpages, photos, videos, etc. Content may be output by the small-screen device 702. Content may additionally, or alternatively, be output on the small-screen device 702 from a remote-access system, a virtualized system, a cloud-based system, and/or an enterprise mobility management system. For example, content may be output on the small-screen device 702 from a hypervisor developed by Citrix Systems, a Citrix remote desktop and applications, a Citrix Cloud, etc. When content is output from other than the small-screen device 702, a resolution of the content on the small-screen device 702 may be affected by a bandwidth, a data transmission speed, etc., of a connection with an original data source. The resolution may not be optimal for the small-screen device screen 704 or the passive magnifying device screen 712. The resolution may be adjusted to achieve the preferred view resolution on the passive magnifying device screen 712.

For example, an image 708 may be output on the small-screen device 702 in a first resolution. The image 708 may be magnified to be viewed as image 714 on the passive magnifying device screen 712. A magnification ratio of the passive magnifying device screen 712 may be calculated as the ratio of a size of an object on the passive magnifying device screen 712 to the size of the object on the small-screen device screen 704. The magnification ratio may depend on the distance between the small-screen device screen 704 and the passive magnifying device screen 712. The resolution of the image 714 may depend on the magnification ratio. For the image 714 to be in the preferred view resolution, the image 708 may need to be output on the small-screen device screen 704 in a second resolution different from the first resolution. The second resolution may be determined based on the magnification ratio and the size of the passive magnifying device screen 712.

In some aspects, the small-screen device 702 may receive the content from a remote computing device in the first resolution and in the second resolution. In some aspects, the second resolution may exceed the maximum screen resolution of the small-screen device screen 704. In that case, the content may have to be output in the maximum screen resolution on the small-screen device screen 704, instead of in the determined second resolution. In some aspects, the second resolution may exceed the maximum PPI of the small-screen device screen 704. In that case, a third resolution may be determined based on the maximum PPI, and the content may have to be output in the third resolution on the small-screen device screen 704, instead of in the determined second resolution.

Figure 8:
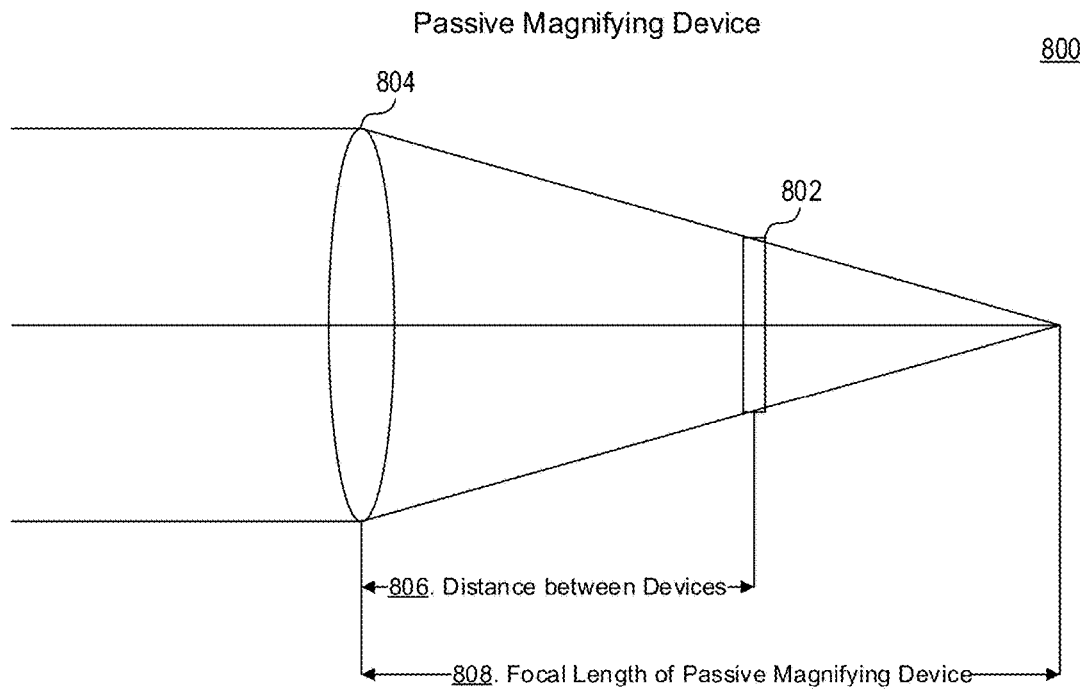
FIG. 8 depicts an illustrative optical magnification mechanism for a passive magnifying device and an illustrative projection mechanism for a projector.
Figure 8:
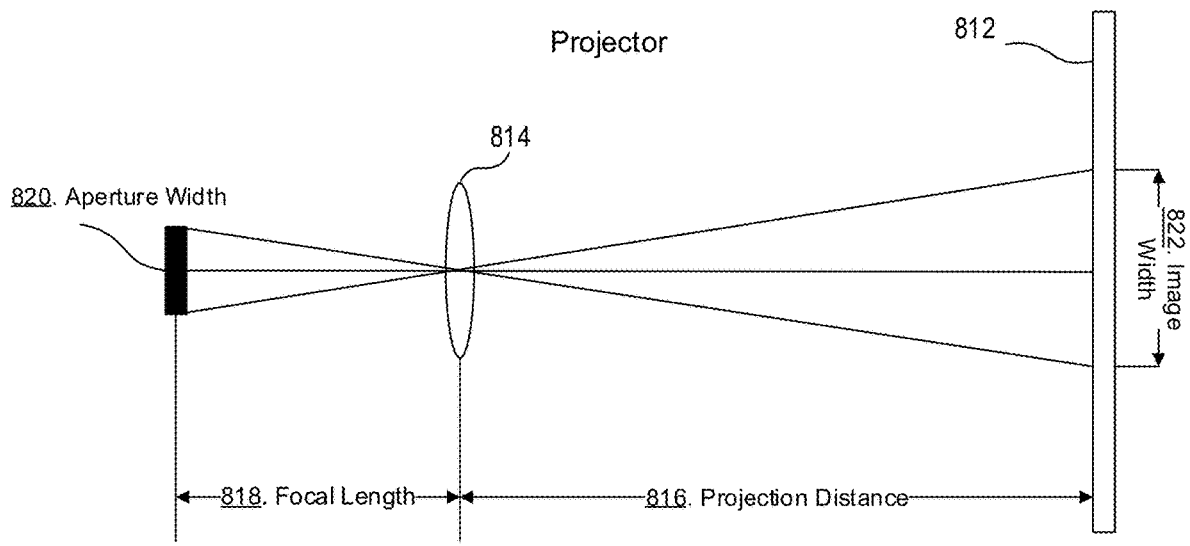

FIG. 8 depicts an illustrative optical magnification mechanism 800 for a passive magnifying device and an illustrative projection mechanism for a projector. Similar to system 700, the optical magnification mechanism 800 may comprise a small-screen device screen 802, and a passive magnifying device screen 804 (e.g., a Fresnel lens). A magnification ratio of the passive magnifying device screen 804 may be based on a distance 806 between the small-screen device screen 802 and the passive magnifying device screen 804, and a focal length 808 of the passive magnifying device screen 804 (e.g., the Fresnel lens).

A mathematical formula for calculating the magnification ratio may be:

$$\text{Magnification Ratio} = \frac{808 \text{ Focal Length}}{808 \text{ Focal Length} - 806 \text{ Distance}}$$

The projection mechanism may comprise a projector lens 814, a projector aperture width 820, a projector focal length 818, and a screen 812. A size 822 of a projected content on the screen 812 may be based on a projection distance 816, and specifications (e.g., the aperture width 820, the focal length 818) of the projector.

A mathematical formula for calculating the size 822 of the projected content on the screen 812 may be:

$$822 \text{ Projected Size} = \frac{816 \text{ Projection Length} - 818 \text{ Focal Length}}{818 \text{ Focal Length}} \times 820 \text{ Aperture}$$

Figure 9:
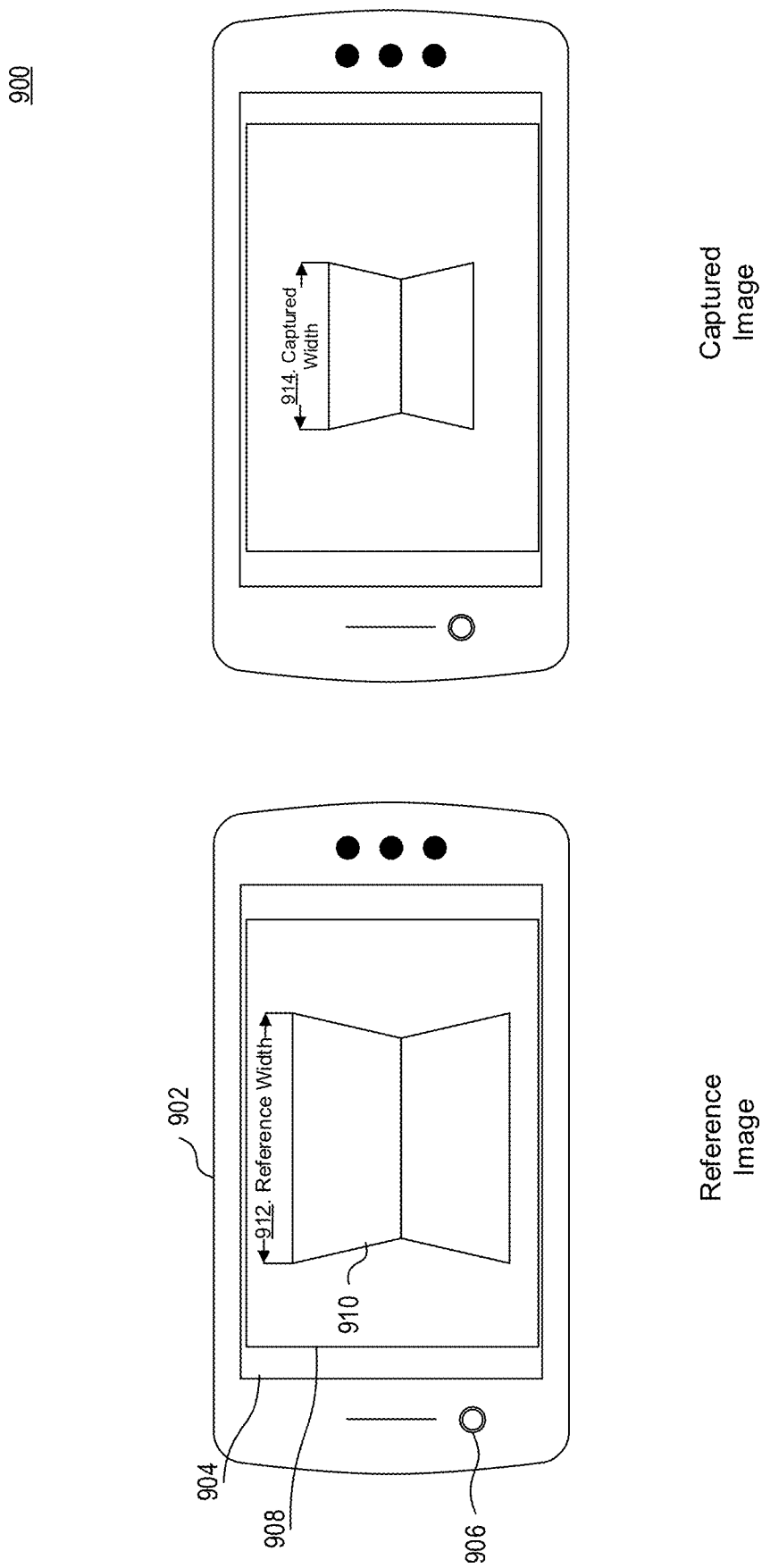
FIG. 9 depicts illustrative screenshots used to determine distance with a captured image.

FIG. 9 depicts illustrative screenshots used to determine distance 806 with a captured image. Referring to FIG. 7, the front-facing camera 706 of the small-screen device 702 may capture an image of the passive magnifying device screen 712. When the distance between the small-screen device screen 704 and the passive magnifying device screen 712 is smaller, the captured image of the passive magnifying device screen 712 may be bigger. When the distance between the small-screen device screen 704 and the passive magnifying device screen 712 is greater, the captured image of the passive magnifying device screen 712 may be smaller.

When the distance between the small-screen device screen 704 and the passive magnifying device screen 712 is at a known reference distance, the front-facing camera 706 of the small-screen device 702 may capture a reference image of the passive magnifying device screen 712. In FIG. 9 reference image, 902 is the small-screen device, 904 is the small-screen device screen, 906 is the front-facing camera, 908 is the edge of the captured photo, 910 is the captured image (i.e., the reference image) of the passive magnifying device screen 712, and 912 is the reference width of the passive magnifying device screen 712 in the reference image 910.

When the distance between the small-screen device screen 704 and the passive magnifying device screen 712 is at an unknown distance to be measured, the front-facing camera 706 of the small-screen device 702 may capture an image of the passive magnifying device screen 712. In FIG. 9 captured image, 914 is the captured width of the passive magnifying device screen 712 in the captured image.

A mathematical formula for calculating the measured distance may be:

$$806 \text{ Distance} = \text{Reference Distance} \times \frac{912 \text{ Reference Width}}{914 \text{ Captured Width}} \times \text{Scaling Factor}$$

The scaling factor may be used to calibrate the mathematical formula so that the measured distance may be accurate.

Figure 10:
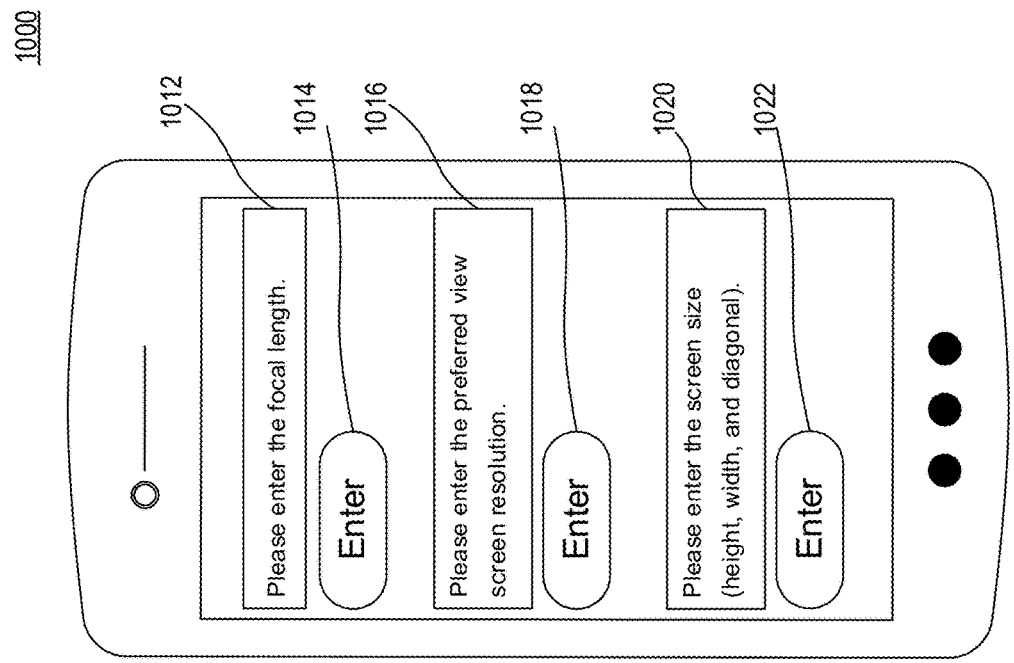
FIG. 10 depicts illustrative screenshots used to determine system parameters.
Figure 10:
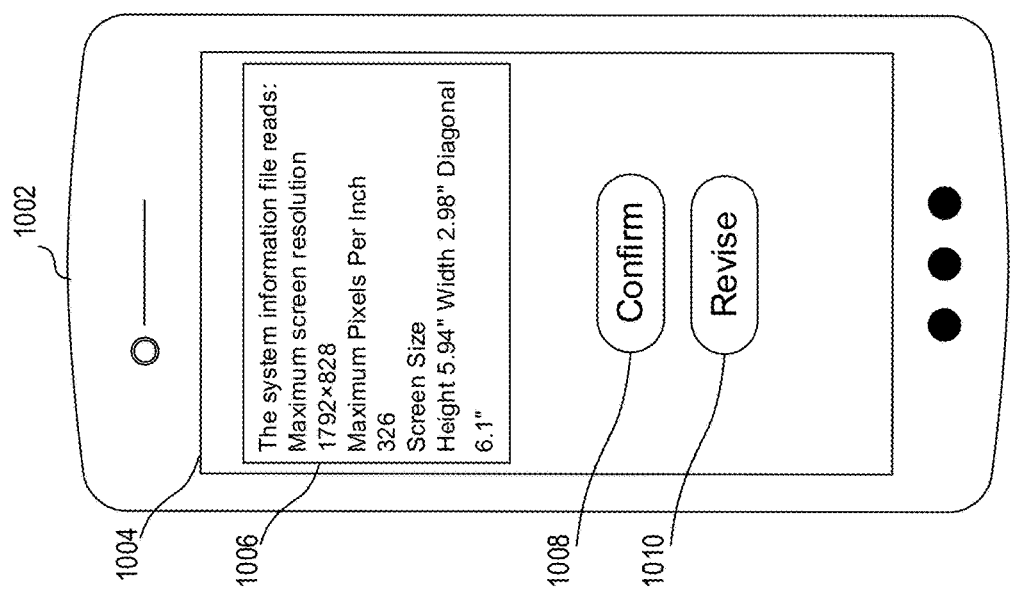

FIG. 10 depicts illustrative screenshots that may be used when determining system parameters for the small-screen device screen 704 and the passive magnifying device screen 712. The system parameters may be used in adjusting the content resolution.

The small-screen device screen 704 may have a size comprising a height, a width, and a diagonal. The small-screen device screen 704 may have a maximum screen resolution and a maximum PPI, both depending on the manufacture. The size, the maximum screen resolution, and the maximum PPI of the small-screen device screen 704 may be retrieved from the small-screen device 702 system information file. The size, the maximum screen resolution, and the maximum PPI of the small-screen device screen 704 may be additionally, or alternatively, revised or input by a user on the small-screen device 702.

For example, in FIG. 10 mobile device system information, 1002 is the small-screen device, 1004 is the small-screen device screen, 1006 is a message comprising detailed maximum screen resolution data, maximum PPI data, and screen size data. The message may be generated by the small-screen device 1002 after retrieving the system parameters from the small-screen device 1002 system information file. If all the system parameters are correct, a user may confirm the system parameters by hitting the confirm button 1008. If some system parameters are incorrect, a user may revise the erroneous system parameters by hitting the revise button 1010. A user may also directly input the system parameters data on the small-screen device screen 1004.

The passive magnifying device screen 712 (e.g., the Fresnel lens) may have a focal length. The passive magnifying device screen 712 may have a size comprising a height, a width, and a diagonal. The passive magnifying device screen 712 may have a preferred view screen resolution. The preferred view screen resolution of the passive magnifying device screen 712 is a recommended screen resolution that may bring the optimal viewing experience on the passive magnifying device screen 712. The focal length, the size, and the preferred view screen resolution of the passive magnifying device screen 712 may be input by a user on the small-screen device 702.

For example, in FIG. 10 passive magnifying device system information, the small-screen device 1002 may generate input forms to collect passive magnifying device system information. The input forms may also be generated by a content resolution adjustment application. 1012, 1016, and 1018 may ask the user to input the focal length, the preferred view screen resolution, and the screen size, respectively. The user may input the system parameters by hitting the enter buttons 1014, 1018, and 1022.

Figure 11:
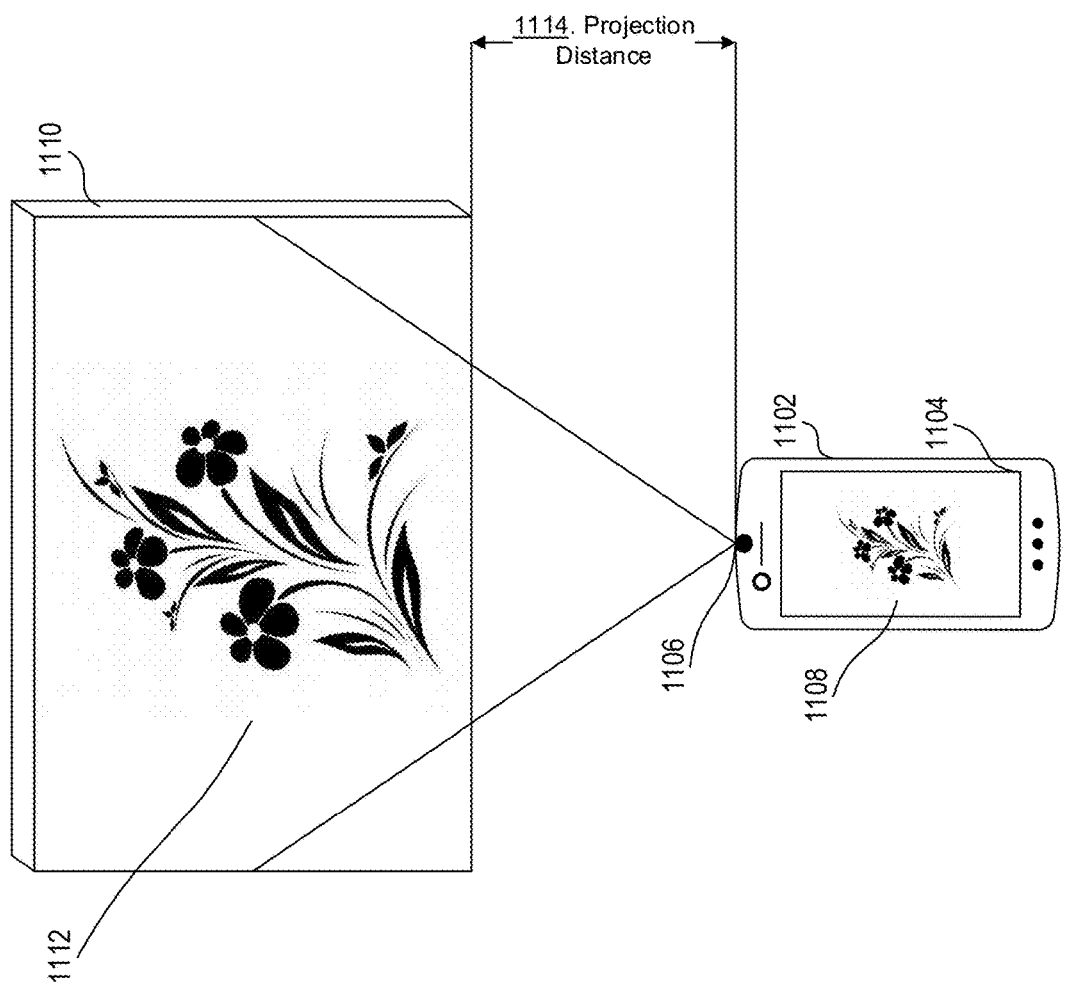
FIG. 11 depicts an illustrative system architecture comprising a projector.

FIG. 11 depicts an illustrative system architecture 1100 comprising a small-screen device 1102 (e.g., mobile phone, smartphone, personal digital assistant (PDA), notebook, iPod Touch, client device 107, terminal 240, etc.), a projector 1106 (e.g., a built-in mobile phone projector, a wireless projector, etc.), and a screen 1110 (e.g., a projector screen, a wall, an object, etc.). The system parameters of the small-screen device screen 1104 in system 1100 may be the same as the system parameters of the small-screen device screen 704 in system 700. The small-screen device 1102 may retrieve the system parameters of the small-screen device screen 1104 from a small-screen device 1102 system information file, similarly like in FIG. 10 mobile device system information.

Content output on the small-screen device 1102 in system 1100 may be the same as the content output on the small-screen device 702 in system 700. The content may also be output on the small-screen device 1102 from a remote-access system, a virtualized system, a cloud-based system, and/or an enterprise mobility management system. For example, the content may be output on the small-screen device 1102 from a hypervisor developed by Citrix Systems, a Citrix remote desktop and applications, a Citrix Cloud, etc. When the content is output from other than the small-screen device 1102, a resolution of the content on the small-screen device 1102 may be affected by a bandwidth or a data transmission speed etc., of a connection with an original data source. The resolution may not be optimal for the small-screen device screen 1104 or the screen 1110 after the content is projected by the projector 1106. The content resolution on the small-screen device screen 1104 may be adjusted to match the preferred view screen resolution on the screen 1110. The screen 1110 may be a passive receiving medium such as a projector screen, a wall, an object, etc. Therefore, there may be no screen resolution based on manufacture. However, there may be a preferred view screen resolution based on a size of the projected content. The preferred view screen resolution may bring the optimal viewing experience of the content on the screen 1110.

The projector 1106 may be a component of the small-screen device 1102. The projector 1106 may be a separate and independent entity from the small-screen device 1102. A separate projector 1106 may be connected to the small-screen device 1102 with a cable such as a USB cable, etc., or wirelessly such as blue tooth, etc. Once connected, the separate projector 1106 may project the content output on the small-screen device 1102 onto the screen 1110, similarly like a built-in projector 1106.

The screen 1110 may be a screen, a wall, an object, etc. that a viewer may prefer to view the content on. Because the screen 1110 is a passive receiving medium of the projected images, the screen 1110 may not have a manufactured screen resolution. However, the screen 1110 may have a preferred view resolution that may bring the optimal viewing experience on the screen 1110. The screen 1110 may have a size (e.g., a height, a width and a diagonal of a projector screen). If the screen 1110 is a wall or an object that may not have an easily definable size, the screen 1110 may have a preferred view size, an arbitrary size that may bring the optimal viewing experience on the screen 1110. For example, a user may want an entire content item to be projected on the screen 1110 instead of having a part of the content item to be outside a boundary of the screen 1110.

The projector 1106 may have a projection distance 1114. The size of the projected content may depend on the projection distance 1114 and specifications (e.g., the aperture width, the focal length, etc.) of the projector 1106. For a given projector 1106, the longer the projection distance 1114, the greater the size of the projected content may be. The shorter the projection distance 1114, the smaller the size of the projected content may be.

A mathematical formula for calculating the size of the projected content for the projector 1106 may be:

$$822 \text{ Projected Size} = \frac{816 \text{ Projection Length} - 818 \text{ Focal Length}}{818 \text{ Focal Length}} \times 820 \text{ Aperture}$$

The projector 1106 may have a maximum projection length. The maximum projection length may depend on the brightness of the projector 1106 such as in lumens. The maximum projection length may be affected by the darkness of the viewing environment. In a darker environment, a projector 1106 with a predetermined brightness may project farther than in a lighter environment. The maximum projection length may limit the projection distance 1114.

The maximum projection length of the projector 1106, the preferred view screen size, the preferred view screen resolution, and the specifications (e.g., the aperture width, the focal length, etc.) of the projector 1106 may be input by a user on the small-screen device 1102, similarly like in FIG. 10 passive magnifying device system information.

The projection distance 1114 may be measured by a proximity, ultrasonic, and/or laser sensor on the small-screen device 1102. The projection distance 1114 may be input by a user on the small-screen device 1102. The projection distance 1114 may also be determined in a similar way as shown in FIG. 9. The captured image may be of a projector screen. When the distance between the projector 1106 and the projector screen is smaller, the captured image of the projector screen may be bigger. When the distance between the projector 1106 and the projector screen is greater, the captured image of the projector screen may be smaller. The captured image may be captured by a front-facing or rear-facing camera of the small-screen device 1102.

When the screen 1110 is a wall or an object that may not have a size that may be easily captured, the projector 1106 may project a virtual ruler onto the screen 1110. A front-facing or rear-facing camera of the small-screen device 1102 may capture an image of the projected virtual ruler. The small-screen device 1102 may then detect a virtual ruler length in the captured image. The projection distance 1114 may be calculated based on the detected virtual ruler length in the captured image, a reference distance, and a reference virtual ruler length in a reference image. The reference image may be captured with projector 1106 placed at the reference distance from the screen 1110.

A mathematical formula for calculating the projection distance 1114 based on the projected virtual ruler may be:

$$1114 \text{ Distance} = \text{Reference Distance} \times \frac{\text{Reference Ruler Size}}{\text{Captured Ruler Size}} \times \text{Scaling Factor}$$

The scaling factor may be used to calibrate the mathematical formula so that the calculated projection distance 1114 may be accurate.

As an example, an image 1108 may be output on the small-screen device 1102 in a first resolution. The image 1108 may be projected by the projector 1106 to be viewed as image 1112 on the screen 1110. The size of the projected content may depend on the projection distance 1114 between the projector 1106 and the screen 1110, and the specifications (e.g., the aperture width, the focal length, etc.) of the projector 1106. Once the size of the projected content is calculated, a user may determine a preferred view screen resolution. For example, if the size of the projected content is greater, the user may prefer a higher screen resolution. For the image 1112 to be in the preferred view screen resolution, the image 1108 may need to be output on the small-screen device screen 1104 in a second resolution different from the first resolution. The second resolution may be determined by matching the preferred view screen resolution on the screen 1110.

In some aspects, the small-screen device 1102 may receive the content from a remote computing device in the first resolution and in the second resolution. In some aspects, the second resolution may exceed the maximum screen resolution of the small-screen device screen 1104. In that case, the content may have to be output in the maximum screen resolution on the small-screen device screen 1104, instead of in the determined second resolution. In some aspects, the second resolution may exceed the maximum PPI of the small-screen device screen 1104. In that case, a third resolution may be determined based on the maximum PPI, and the content may have to be output in the third resolution on the small-screen device screen 1104, instead of in the determined second resolution.

Figure 12:
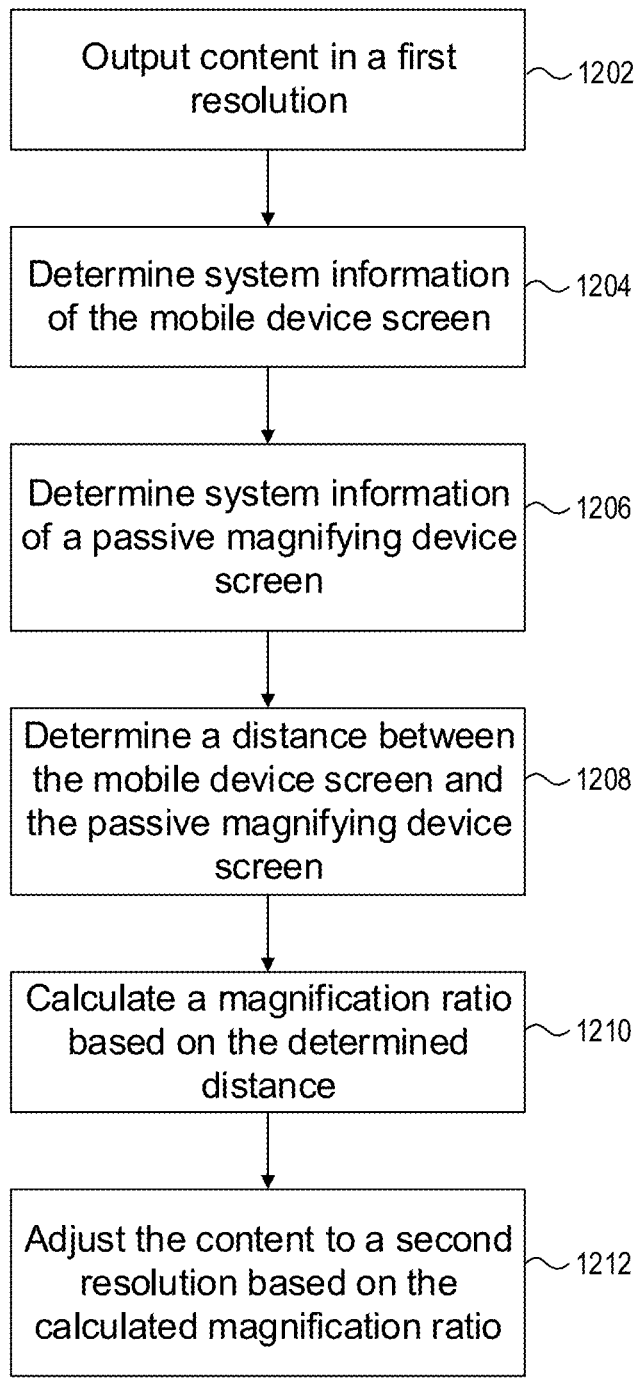
FIG. 12 is a flow chart showing a method of content resolution adjustment comprising a passive magnifying device.

FIG. 12 is a flow chart showing a method 1200 of content resolution adjustment comprising a small-screen device (e.g., a small-screen device 702) and a passive magnifying device (e.g., a passive magnifying device 712).

At 1202, the small-screen device 702 may output content on the small-screen device screen 704. The content may be output in a first resolution. The content may be output by the small-screen device 702. Additionally, or alternatively, the content may be output on the small-screen device 702 from a remote computing device. The remote computing device may be from a remote-access system, a virtualized system, a cloud-based system, and/or an enterprise mobility management system. For example, the content may be output on the small-screen device 702 from a hypervisor developed by Citrix Systems, a Citrix remote desktop and applications, a Citrix Cloud, etc. When the content is output from other than the small-screen device 702, the first resolution of the content on the small-screen device 702 may be affected by a bandwidth or a data transmission speed etc., of a connection with an original data source.

At 1204, the small-screen device 702 may determine a maximum screen resolution, a maximum PPI, and a screen size of the small-screen device screen 704. The maximum screen resolution, the maximum PPI, and the screen size of the small-screen device screen 704 may be retrieved from a small-screen device 702 system information file, such as shown in FIG. 10 mobile device system information. The maximum screen resolution, the maximum PPI, and the screen size of the small-screen device screen 704 may be used to adjust the content resolution.

At 1206, the small-screen device 702 may determine a focal length, a preferred view screen resolution, and a screen size of the passive magnifying device screen 712. The preferred view screen resolution is a recommended screen resolution for the optimal viewing experience on the passive magnifying device screen 712. The focal length, the preferred view screen resolution, and the screen size of the passive magnifying device screen 712 may be input by a user on the small-screen device 702, such as shown in FIG. 10 passive magnifying device system information. The focal length may be used to calculate a magnification ratio. The preferred view screen resolution, and the screen size of the passive magnifying device screen 712 may be used to adjust the content resolution.

At 1208, the small-screen device 702 may determine a distance between the small-screen device screen 704 and the passive magnifying device screen 712. Additionally, or alternatively, the distance between the small-screen device screen 704 and the passive magnifying device screen 712 may be input by a user on the small-screen device 702. The measurement of the distance may be made by a proximity, ultrasonic, and/or laser sensor on the small-screen device 702. The measurement of the distance may be made by a front-facing camera 706 of the small-screen device 702. The front-facing camera 706 of the small-screen device 702 may capture an image of the passive magnifying device screen 712. Based on the size of the passive magnifying device screen 712 in the captured image and a reference size of the passive magnifying device screen 712 in a reference image (e.g., reference image 910), the distance between the small-screen device screen 704 and the passive magnifying device screen 712 may be calculated. A detailed method is shown in FIG. 9. A mathematical formula for calculating the measured distance between the small-screen device screen 704 and the passive magnifying device screen 712 may be:

806 Distance =

$$\text{Reference Distance} \times \frac{912 \text{ Reference Width}}{914 \text{ Captured Width}} \times \text{Scaling Factor}$$

At 1210, the small-screen device 702 may calculate a magnification ratio based on the passive magnifying device 716 focal length and the measured distance 806. A magnification ratio for the passive magnifying device 716 may be calculated as the ratio of a size of an object on the passive magnifying device screen 712 to the size of the object on the small-screen device screen 704. The passive magnifying device screen 712 may be an optical magnifying lens (e.g., a Fresnel lens). A detailed optical magnification mechanism 800 is shown in FIG. 8. A mathematical formula for calculating the magnification ratio may be:

$$\text{Magnification Ratio} = \frac{808 \text{ Focal Length}}{808 \text{ Focal Length} - 806 \text{ Distance}}$$

At 1212, the small-screen device 702 may adjust the content on the small-screen device screen 704 to a second resolution. The content may be adjusted to be output in the second resolution by the small-screen device 702. The content in the second resolution may additionally, or alternatively, be requested from a remote computing device. The second resolution may provide the preferred view screen resolution of the content on the passive magnifying device screen 712. The second resolution may be determined based on a series of mathematical formulas.

$$\text{2nd } PPI = \text{Magnification Ratio} \times \frac{\sqrt{\text{Preferred Width}^2 + \text{Preferred Height}^2}}{\text{Diagonal Screen Size of Passive Display Device}}$$

$$\text{2nd Resolution Height} = \frac{\text{2nd } PPI \times \text{Diagonal Screen Size of Small-Screen Device}}{\sqrt{1 + \left(\frac{\text{Small-Screen Device Screen Width}}{\text{Small-Screen Device Screen Height}}\right)^2}}$$

$$\text{2nd Resolution Width} = \text{2nd Resolution Height} \times \frac{\text{Small-Screen Device Screen Width}}{\text{Small-Screen Device Screen Height}}$$

A second PPI may be first calculated based on the calculated magnification ratio, the preferred view screen resolution width and height, and the diagonal screen size of the passive magnifying device screen 712. The second resolution height may then be calculated based on the second PPI, the diagonal screen size of the small-screen device screen 704, and the aspect ratio (the ratio of the small-screen device screen 704 width to the small-screen device screen 704 height) of the small-screen device screen 704. The second resolution width may then be calculated based on the second resolution height and the aspect ratio of the small-screen device screen 704.

Figure 13:
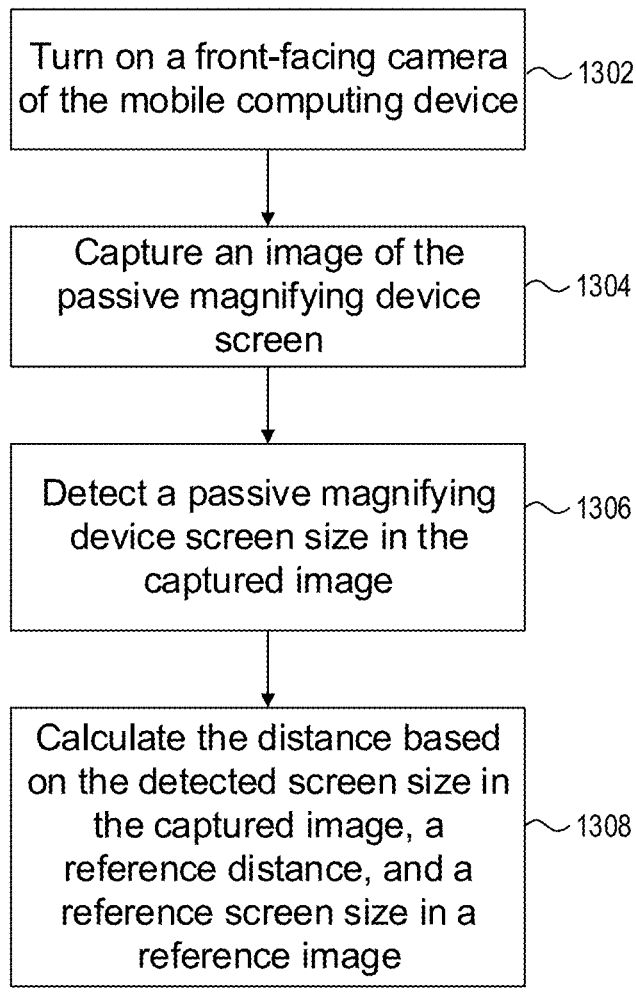
FIG. 13 is a flow chart showing a method of determining distance with a captured image.

FIG. 13 is a flow chart showing a method 1208 of determining distance between the small-screen device screen 704 and the passive magnifying device screen 712 with a captured image (e.g., captured image 914). Details may be referred in FIG. 9.

At 1302, a front-facing camera 706 of the small-screen device 702 may be turned on. For the projector system 1100, a rear-facing camera may also be used.

At 1304, the front-facing camera 706 of the small-screen device 702 may capture an image of the passive magnifying device screen 712. For the projector system 1100, the front-facing or rear-facing camera of the small-screen device 1102 may capture an image of a projector screen. If the screen 1110 is a wall or an object that may not have a size that may be captured in an image, the projector 1106 may project a virtual ruler on the screen 1110. The front-facing or the rear-facing camera may capture an image of the virtual ruler.

At 1306, the small-screen device 702 may detect a passive magnifying device screen 712 size in the captured image (e.g., captured image 914). For the projector system 1100, the small-screen device 1102 may detect a projector screen size in the captured image. Or the small-screen device 1102 may detect a virtual ruler size in the captured image.

At 1308, the small-screen device 702 may calculate the distance based on the detected passive magnifying device screen 712 size in the captured image (e.g., captured image 914), a reference distance, and a reference passive magnifying device screen 712 size in a reference image (e.g., reference image 910). The reference image is captured with the small-screen device 702 placed at the reference distance from the passive magnifying device screen 712. A mathematical formula to calculate the distance may be:

806 Distance =

$$\text{Reference Distance} \times \frac{912 \text{ Reference Width}}{914 \text{ Captured Width}} \times \text{Scaling Factor}$$

For the projector system 1100, the small-screen device 1102 may calculate the distance based on the detected projector screen size or the virtual ruler size in the captured image, a reference distance, and a reference projector screen size or a reference virtual ruler size in a reference image. The reference image is captured with the projector 1106 placed at the reference distance from the screen 1110. A mathematical formula to calculate the distance may be:

1114 Distance =

$$\text{Reference Distance} \times \frac{\text{Reference Ruler Size}}{\text{Captured Ruler Size}} \times \text{Scaling Factor}$$

Figure 14:
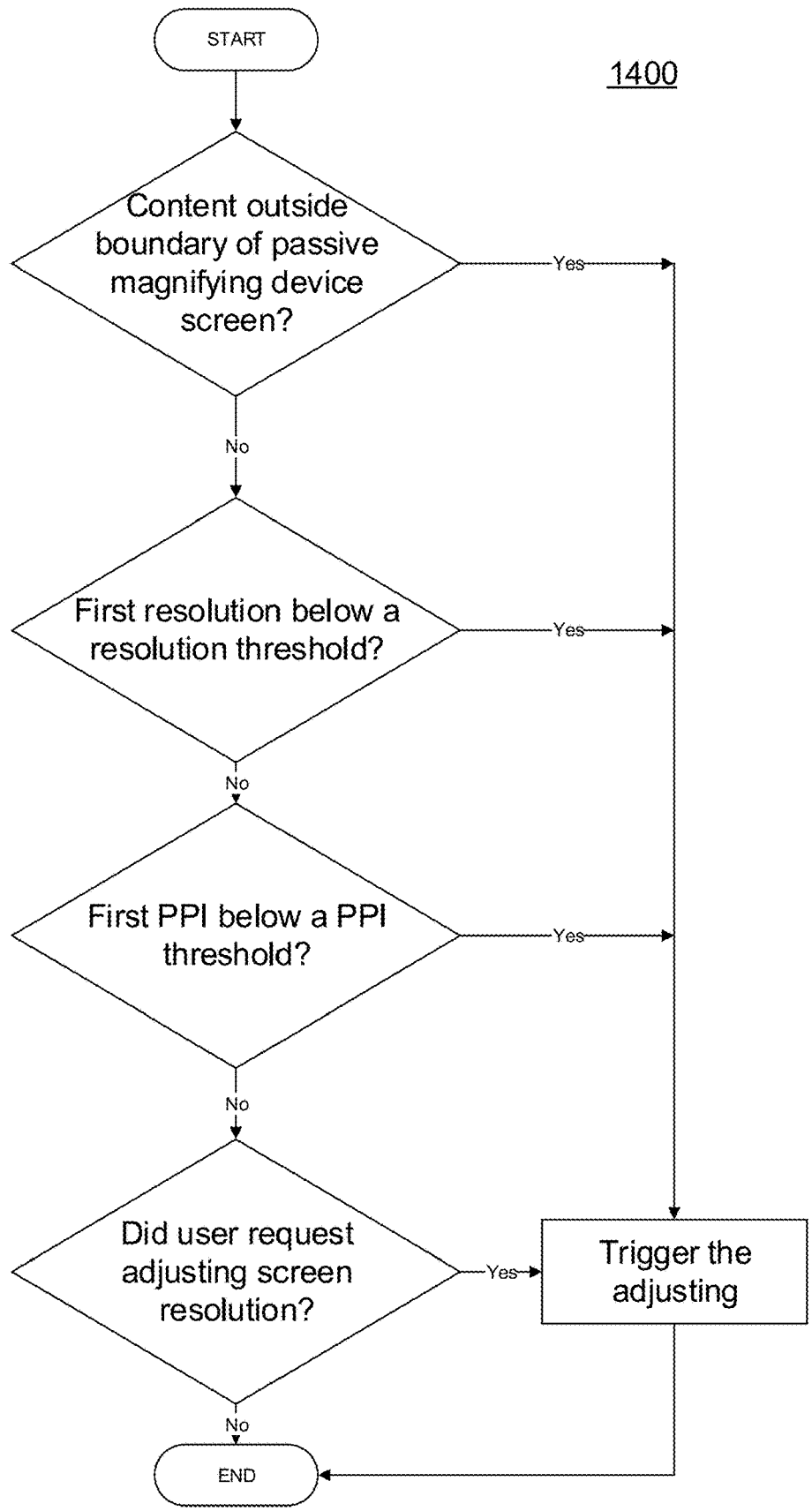
FIG. 14 is a flow chart showing a method of triggering content resolution adjustment.

FIG. 14 is a flow chart showing a method 1400 of triggering content resolution adjustment. Content resolution adjustment may be triggered when the small-screen device 702 determines that a portion of the content is out of a boundary of the passive magnifying device screen 712. If a portion of the content is out of a boundary of the passive magnifying device screen 712, the resolution of the content may not be optimal because the portion of the content may not be easily viewable. The resolution of the content on the small-screen device 702 may need to be adjusted. For the projector system 1100, if a portion of the content is out of a boundary of a screen 1110 (especially a projector screen), the resolution of the content on the small-screen device 1102 may need to be adjusted. Determining that a portion of the content is out of a boundary of a passive display device screen (e.g., a screen magnifier or a projector screen) may be made by a camera of the small-screen device 702 or 1102 taking a photo of the passive display device screen 712 or 1110 and detecting out-of-boundary content in the photo.

Content resolution adjustment may be triggered when the small-screen device 702 or 1102 determines that the first resolution is below a resolution threshold. If the first resolution is below the resolution threshold, the viewing experience on the passive display device screen 712 or 1110 may not be optimal. The resolution of the content on the small-screen device 702 or 1102 may need to be adjusted. The resolution threshold may be set on the small-screen device 702 or 1102. The small-screen device 702 or 1102 may compare the first resolution with the resolution threshold to determine if the first resolution is below the resolution threshold.

Content resolution adjustment may be triggered when the small-screen device 702 or 1102 determines that a first PPI associated with the first resolution is below a PPI threshold. If the first PPI is below the PPI threshold, the viewing experience on the passive display device screen 712 or 1110 may not be optimal. The resolution of the content on the small-screen device 702 or 1102 may need to be adjusted to accommodate a higher PPI. The PPI threshold may be set on the small-screen device 702 or 1102. The small-screen device 702 or 1102 may compare the first PPI with the PPI threshold to determine if the first PPI is below the PPI threshold.

Content resolution adjustment may be triggered based on a user request. If the user determines that the viewing experience on the passive display device screen 712 or 1110 is not optimal, the resolution of the content on the small-screen device 702 or 1102 may need to be adjusted. The user request (e.g., an indication to adjust) may be received by the small-screen device 702 or 1102 in a content resolution adjustment application.

Figure 15:
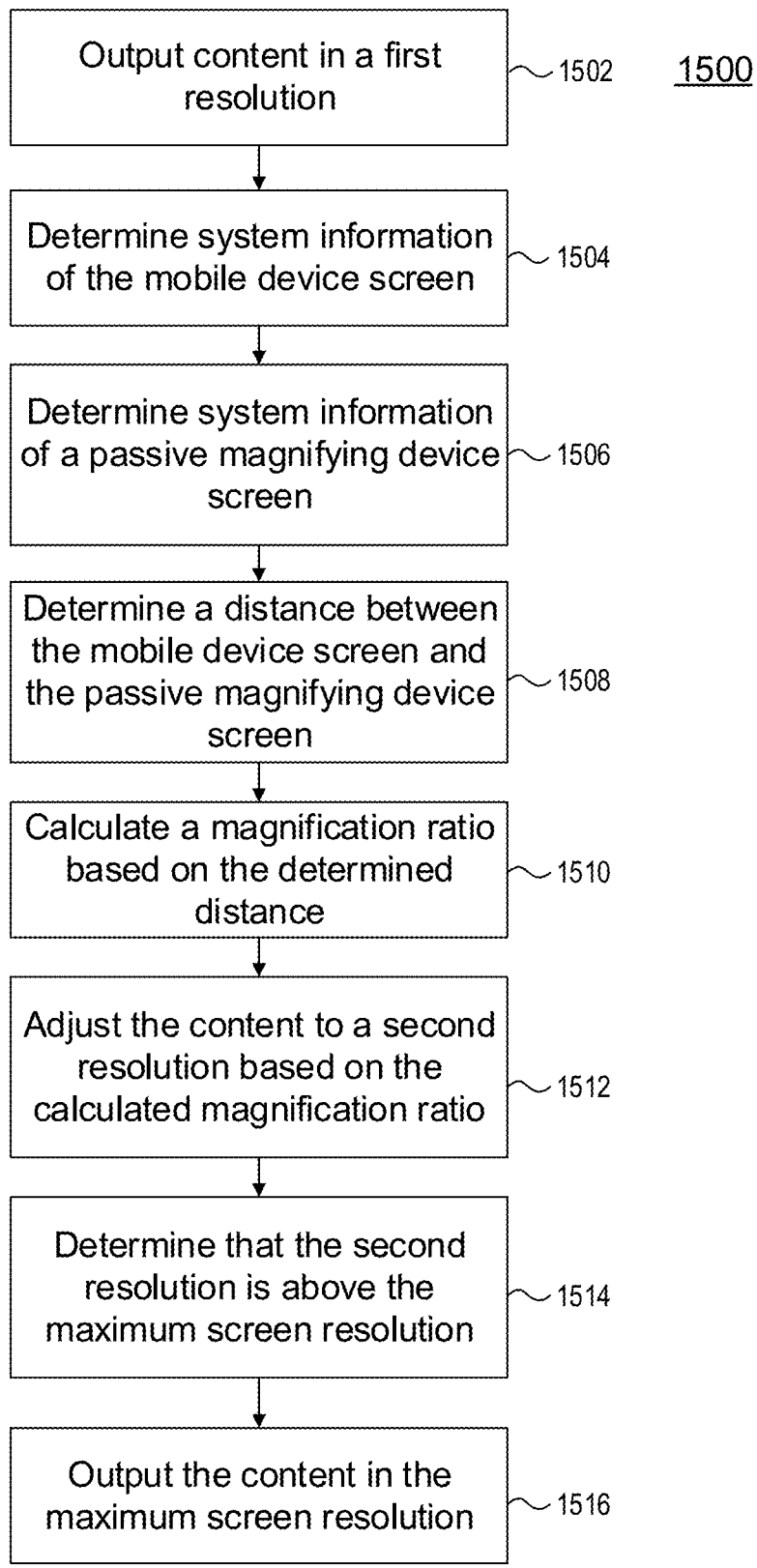
FIG. 15 is a flow chart showing a method of adjusting content resolution to maximum screen resolution.

FIG. 15 is a flow chart showing a method 1500 of adjusting content resolution to maximum screen resolution. At 1502, 1504, 1506, 1508, 1510, and 1512, the method 1500 may be referred in the method 1200 at corresponding 1202, 1204, 1206, 1208, 1210, and 1212, respectively.

At 1514, the small-screen device 702 or 1102 may determine that the second resolution is above the maximum screen resolution of the small-screen device screen 704 or 1104. The maximum screen resolution may be retrieved in a small-screen device 702 or 1102 system information file at 1504.

At 1516, the small-screen device 702 or 1102 may output the content in the maximum screen resolution on the small-screen device screen 704 or 1104, instead of in the determined second resolution. The small-screen device 702 or 1102 may adjust the content resolution on the small-screen device 702 or 1102. The small-screen device may additionally, or alternatively request the content in the maximum resolution from a remote computing device.

Figure 16:
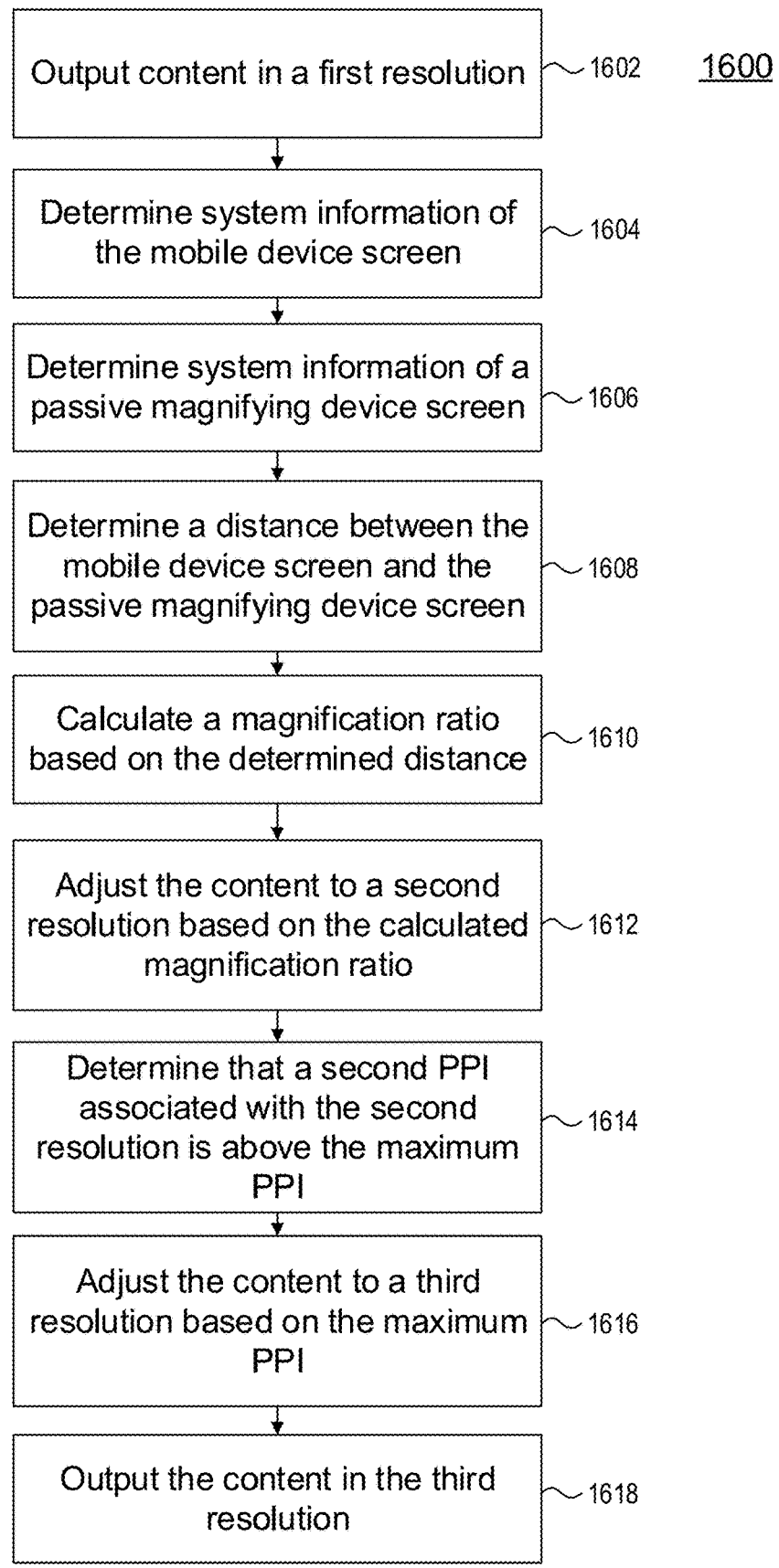
FIG. 16 is a flow chart showing a method of adjusting content resolution based on maximum PPI.

FIG. 16 is a flow chart showing a method 1600 of adjusting content resolution based on maximum PPI. At 1602, 1604, 1606, 1608, 1610, and 1612, the method 1600 may be referred in the method 1200 at corresponding 1202, 1204, 1206, 1208, 1210, and 1212, respectively.

At 1614, the small-screen device 702 or 1102 may determine that a second PPI associated with the second resolution is above the maximum PPI of the small-screen device screen 704 or 1104. The maximum PPI may be retrieved in a small-screen device 702 or 1102 system information file at 1604.

At 1616, the small-screen device 702 or 1102 may determine a third resolution based on the maximum PPI of the small-screen device screen 704 or 1104. The third resolution may be determined in a similar way with determining the second resolution. However, instead of using the magnification ratio to calculate a second PPI, the maximum PPI may be used.

3rd Resoultion Height=

$$\frac{\text{Max } PPI \times \text{Diagonal Screen Size of Small-Screen Device}}{\sqrt{1+\left(\frac{\text{Small-Screen Device Screen Width}}{\text{Small-Screen Device Screen Height}}\right)^2}}$$

3rd Resoultion Width =

$$\text{3rd Resoultion Height} \times \frac{\text{Small-Screen Device Screen Width}}{\text{Small-Screen Device Screen Height}}$$

At 1618, the small-screen device 702 or 1102 may output the content in the third screen resolution on the small-screen device screen 704 or 1104, instead of in the determined second resolution. The small-screen device 702 or 1102 may adjust the content resolution on the small-screen device 702 or 1102. The small-screen device may additionally, or alternatively request the content in the third resolution from a remote computing device.

Figure 17:
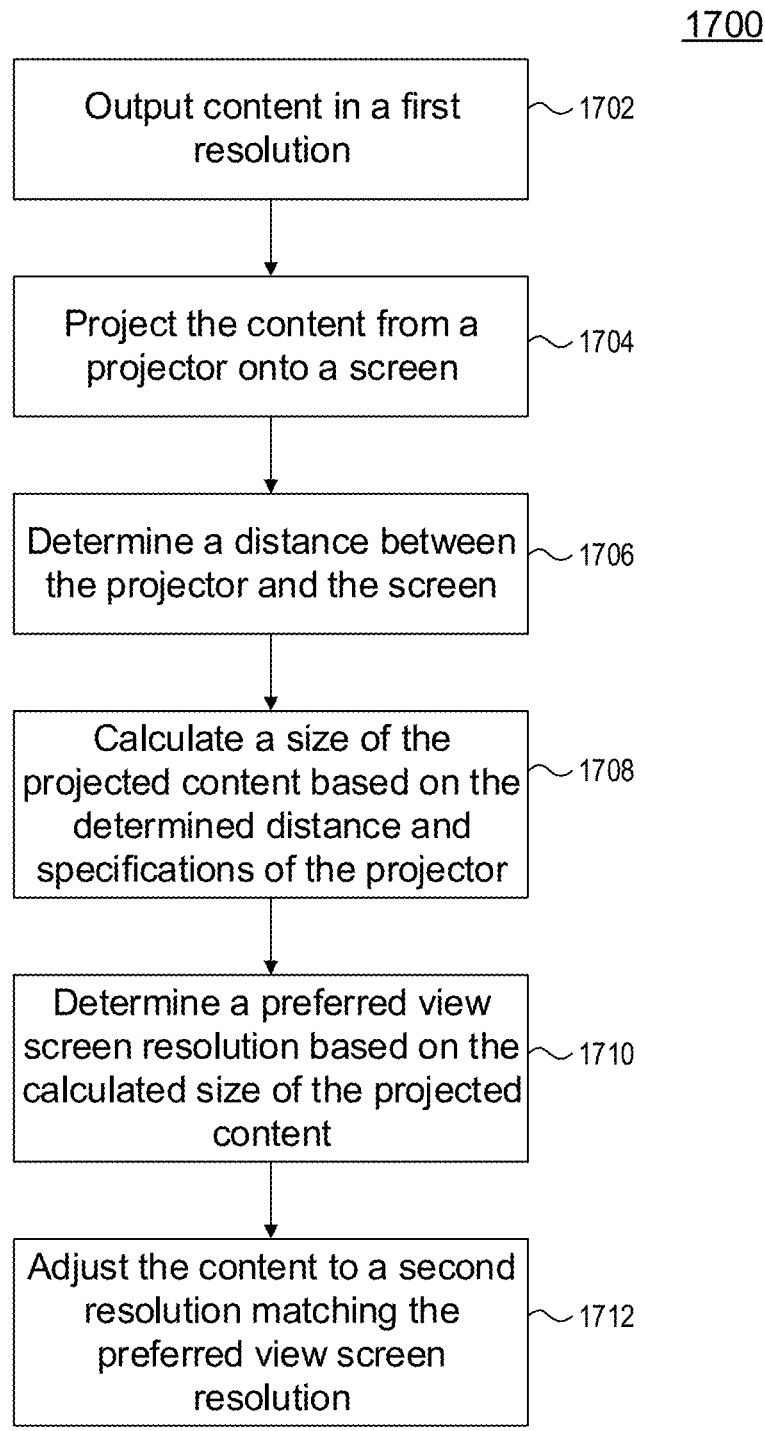
FIG. 17 is a flow chart showing a method of content resolution adjustment comprising a projector.

FIG. 17 is a flow chart showing a method 1700 of content resolution adjustment comprising a small-screen device 1102, a projector 1106, and a screen 1110.

At 1702, the method 1700 may be referred in the method 1200 at 1202.

At 1704, the projector 1106 may project the content from the small-screen device screen 1104 onto the screen 1110. The screen 1110 may be a projector screen, a wall, or an object that a user may prefer to view the content on. The projector 1106 may enlarge the content for an easier view on the screen 1110 compared to the small-screen device screen 1104. The projector 1106 may be a component of the small-screen device 1102 (i.e., a built-in projector). The projector 1106 may also be a separate and independent entity from the small-screen device 1102 (e.g., a wireless projector).

At 1706, the method 1700 may be referred in the method 1200 at 1208. The small-screen device 1102 may determine a distance between the projector 1106 and the screen 1110. The distance between the projector 1106 and the screen 1110 may be additionally, or alternatively, input by a user on the small-screen device 1102. The measurement of the distance may be made by a proximity, ultrasonic, and/or laser sensor on the small-screen device 1102. The measurement of the distance may be made by a front-facing or rear-facing camera of the small-screen device 1102. The camera of the small-screen device 1102 may capture an image of the screen 1110 (e.g., a projector screen). Based on the size of the projector screen in the captured image and a reference size of the projector screen in a reference image, the distance between the projector 1106 and the projector screen may be calculated. A detailed method is shown in FIG. 9. If the screen 1110 is a wall or an object that may not have a size that may be captured in an image, the projector 1106 may project a virtual ruler onto the screen 1110. The camera of the small-screen device 1102 may capture an image of the virtual ruler. Based on the size of the virtual ruler in the captured image and a reference size of the virtual ruler in a reference image, the distance between the projector 1106 and the screen 1110 may be calculated, similarly as shown in FIG. 9. A mathematical formula for calculating the measured distance between the projector 1106 and the screen 1110 may be:

$$1114 \text{ Distance} = \text{Reference Distance} \times \frac{\text{Reference Ruler Size}}{\text{Captured Ruler Size}} \times \text{Scaling Factor}$$

At 1708, the small-screen device 1102 may calculate a size of the projected content based on the projection distance 1114 and specifications (e.g., the aperture width, the focal length, etc.) of the projector 1106. The projection distance 1114 may be limited by a maximum projection length of the projector 1106. The maximum projection length may be affected by the brightness (such as in lumens) of the projector 1106 and the darkness of the environment. The maximum projection length and the specifications of the projector 1106 may be input by a user on the small-screen device 1102, similarly like in FIG. 10 passive magnifying device system information. A mathematical formula for calculating the size of the projected content for the projector 1106 may be:

$$822 \text{ Projected Size} = \frac{816 \text{ Projection Length} - 818 \text{ Focal Length}}{818 \text{ Focal Length}} \times 820 \text{ Aperture}$$

At 1710, a preferred view screen resolution may be determined. The screen 1110 is a passive receiving medium such as a projector screen, a wall, an object, etc. There may be no manufactured screen resolution. There may be a preferred view screen resolution that may bring the optimal viewing experience on the screen 1110. The preferred view screen resolution may depend on the size of the projected content. If the size of the projected content is smaller, the preferred view screen resolution may be lower, especially when a bandwidth or a transmission speed of a connection with an original data source is low. If the size of the projected content is greater, the preferred view screen resolution may be higher. The screen size (if the screen 1110 is a projector screen), the preferred view screen size (if the screen 1110 is a wall, an object, etc.), and the preferred view screen resolution may be input by a user on the small-screen device 1102, similarly like in FIG. 10 passive magnifying device system information. The preferred view screen resolution may be used to adjust the content resolution.

At 1712, the small-screen device 1102 may adjust the content on the small-screen device screen 1104 to a second resolution. The content may be adjusted to be output in the second resolution by the small-screen device 1102. The content in the second resolution may additionally, or alternatively, be requested from a remote computing device. The second resolution may provide the preferred view screen resolution of the content on the screen 1110. The second resolution may be determined by matching the preferred view screen resolution on the screen 1110.

In some aspects, the second resolution may exceed the maximum resolution of the small-screen device screen 1104. The small-screen device 1102 may output the content in the maximum resolution instead of the second resolution. In some aspects, a second PPI associated with the second resolution may exceed the maximum PPI of the small-screen device screen 1104. A third resolution may be calculated based on the maximum PPI. The small-screen device 1102 may output the content in the third resolution instead of the second resolution.

In the above description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:
1. A method comprising:
   outputting content on a screen of a first device, said content output in a first resolution;
   determining a maximum screen resolution, a maximum Pixels Per Inch (PPI), and a screen size of the screen of the first device;
   determining a focal length, a preferred view screen resolution, and a screen size of a screen of a passive magnifying device;
   determining a distance between the first device screen and the passive magnifying device screen;
   calculating a magnification ratio based on the passive magnifying device focal length and the determined distance;
   adjusting the content on the screen of the first device to a second resolution based on the calculated magnifica- tion ratio to provide the preferred view screen resolution of the content on the screen of the passive magnifying device.

2. The method of claim 1, further comprising:
receiving, by the first device and from a remote computing device, the content in the first resolution and in the second resolution.

3. The method of claim 1, wherein the determining the maximum screen resolution, the maximum PPI, and the screen size of the screen of the first device comprises retrieving parameters of said first device from a first device system information file.

4. The method of claim 1, wherein the determining the focal length, the preferred view screen resolution, and the screen size of the screen of the passive magnifying device comprises receiving a user input of parameters of said passive magnifying device.

5. The method of claim 1, wherein the determining the distance comprises:
turning on a front-facing camera of the first device;
capturing an image of the passive magnifying device screen;
detecting a passive magnifying device screen size in the captured image; and
calculating the distance based on the detected screen size in the captured image, a reference distance, and a reference screen size in a reference image, wherein the reference image is captured with the first device placed at the reference distance from the passive magnifying device.

6. The method of claim 1, wherein the determining the distance comprises using one of a proximity, ultrasonic, or laser sensor on the first device to measure the distance.

7. The method of claim 1, further comprising triggering the adjusting from the first resolution to the second resolution by determining that a portion of the content is out of a boundary of the screen of the passive magnifying device.

8. The method of claim 1, further comprising triggering the adjusting from the first resolution to the second resolution by determining that the first resolution is below a resolution threshold.

9. The method of claim 1, further comprising triggering the adjusting from the first resolution to the second resolution by determining that a first PPI associated with the first resolution is below a PPI threshold.

10. The method of claim 1, further comprising triggering the adjusting from the first resolution to the second resolution by receiving a user indication to initiate the adjusting.

11. The method of claim 1, further comprising:
determining that the second resolution is above the maximum screen resolution; and
outputting the content on the screen of the first device, said content output in the maximum screen resolution.

12. The method of claim 1, further comprising:
determining that a second PPI associated with the second resolution is above the maximum PPI;
adjusting the content on the screen of the first device to a third resolution based on the maximum PPI; and
outputting the content on the screen of the first device, said content output in the third resolution.

13. One or more non-transitory computer-readable media storing computer readable instructions that, when executed by one or more processors of a first device, cause the device to:
output content on a screen of the first device, said content output in a first resolution;
determine a maximum screen resolution, a maximum Pixels Per Inch (PPI), and a screen size of the screen of the first device;
determine a focal length, a preferred view screen resolution, and a screen size of a screen of a passive magnifying device;
determine a distance between the first device screen and the passive magnifying device screen;
calculate a magnification ratio based on the passive magnifying device focal length and the determined distance; and
adjust the content on the screen of the first device to a second resolution based on the calculated magnification ratio to provide the preferred view screen resolution of the content on the screen of the passive magnifying device.

14. The non-transitory computer-readable media of claim 13, wherein the instructions, when executed by the one or more processors further cause the first device to:
receive, from a remote computing device, the content in the first resolution and in the second screen resolution.

15. The non-transitory computer-readable media of claim 13, wherein the instructions that cause the first device to determine the distance comprises instructions that, when executed, cause the device to:
turn on a front-facing camera of the first device;
capture an image of the passive magnifying device screen;
detect a passive magnifying device screen size in the captured image; and
calculate the distance based on the detected screen size in the captured image, a reference distance, and a reference screen size in a reference image, wherein the reference image is captured with the first device placed at the reference distance from the passive magnifying device.

16. The non-transitory computer-readable media of claim 13, wherein the instructions, when executed by the one or more processors further cause the first device to:
trigger the adjusting from the first resolution to the second resolution by determining that the first resolution is below a resolution threshold.

17. A method comprising:
outputting content on a screen of a first device, said content output in a first resolution;
projecting the content from a projector onto a second screen;
determining a distance between the projector and the second screen;
calculating a size of the projected content based on the determined distance and specifications of the projector;
determining a preferred view screen resolution based on the calculated size of the projected content; and
adjusting the content on the screen of the first device to a second resolution matching the preferred view screen resolution of the content on the second screen.

18. The method of claim 17, further comprising:
receiving, from a remote computing device, the content in the first resolution and in the second resolution.

19. The method of claim 17, wherein the determining the distance comprises:
turning on a camera of the first device;
projecting a virtual ruler from the projector onto the second screen;
capturing an image of the virtual ruler;
detecting a virtual ruler length in the captured image; and
calculating the distance based on the detected virtual ruler length in the captured image, a reference distance, and a reference virtual ruler length in a reference image, wherein the reference image is captured with the projector placed at the reference distance from the second screen.

20. The method of claim 17, wherein the determining the distance comprises receiving a user input of the distance between the projector and the second screen.

* * * * *